United States Patent
Juby et al.

(10) Patent No.: US 7,669,419 B2
(45) Date of Patent: Mar. 2, 2010

(54) ELECTRICAL POWER SUPPLY SYSTEM

(75) Inventors: Lee Juby, Frodsham (GB); Russell Benstead, Ellesmere Port (GB); Simon Redford, Chester (GB)

(73) Assignee: Energetix Group Limited (GB)

( * ) Notice: Subject to any disclaimer, the term of this patent is extended or adjusted under 35 U.S.C. 154(b) by 0 days.

(21) Appl. No.: 11/075,942

(22) Filed: Mar. 8, 2005

(65) Prior Publication Data

US 2005/0188689 A1 Sep. 1, 2005

Related U.S. Application Data

(63) Continuation of application No. PCT/GB03/05230, filed on Dec. 2, 2003.

(30) Foreign Application Priority Data

| Dec. 7, 2002 | (GB) | ................................. 0228599.7 |
| Apr. 29, 2003 | (GB) | ................................. 0309834.0 |

(51) Int. Cl.
  *F01K 13/02* (2006.01)
(52) U.S. Cl. .......................................... 60/646; 60/657
(58) Field of Classification Search ................... 60/646, 60/657
  See application file for complete search history.

(56) References Cited

U.S. PATENT DOCUMENTS

| 3,531,943 | A | * | 10/1970 | Parnag et al. .................. 62/621 |
| 4,192,152 | A | * | 3/1980 | Armstrong et al. ............ 62/402 |
| 4,281,256 | A | | 7/1981 | Ahrens et al. |
| 5,228,309 | A | * | 7/1993 | McCullough ............... 62/323.1 |
| 6,142,755 | A | | 11/2000 | Shiinoki et al. |
| 6,153,943 | A | * | 11/2000 | Mistr, Jr. ...................... 290/52 |
| 6,276,123 | B1 | | 8/2001 | Chen et al. |
| 6,327,858 | B1 | | 12/2001 | Negre et al. |
| 6,464,467 | B2 | * | 10/2002 | Sullivan et al. ................ 417/53 |
| 6,850,426 | B2 | * | 2/2005 | Kojori et al. ................. 363/123 |
| 2001/0043878 | A1 | | 11/2001 | Sullivan et al. |
| 2004/0085046 | A1 | * | 5/2004 | Ye et al. ......................... 322/13 |

FOREIGN PATENT DOCUMENTS

| GB | 2342955 | 4/2000 |
| JP | 56-165701 | 12/1981 |
| JP | 06-101659 | 4/1994 |
| JP | 07-170660 | 7/1995 |
| JP | 10-257696 | 9/1998 |
| JP | 2000-032685 | 1/2000 |
| JP | 2000-324710 | 11/2000 |
| WO | WO02/090747 | 11/2002 |

* cited by examiner

*Primary Examiner*—Hoang M Nguyen
(74) *Attorney, Agent, or Firm*—Gauthier & Connors LLP

(57) ABSTRACT

A system for generating back-up electrical power. The system includes a vessel adapted to contain a volume of compressed gas and a valve to release gas from the vessel at a predetermined pressure. A scroll expander is adapted to receive and pass the released gas. A rotary member is rotated by the flow of the released gas passed by the expander. An electrical generator is drivingly connected to the rotatable member of the expander to generate a supply of electrical power. A power conditioning unit has at least one capacitor to store electrical energy to provide a back-up electrical supply for a brief period until the scroll expander and generator can produce the required supply of electrical power.

17 Claims, 4 Drawing Sheets

ELECTRICAL POWER SUPPLY SYSTEM

This is a continuation of copending application International Application PCT/GB2003/005230 filed on Dec. 2, 2003 and which designated the U.S.

THIS INVENTION concerns a system for generating back-up electrical power thus to provide an uninterruptible power supply for installations such as computers and communications systems.

Conventionally, back-up power has been supplied by stand-by generators operated using fossil fuels and often started by a battery. Batteries used to start stand-by generators or to store energy to provide uninterruptible power supplies have a limited life and present a significant maintenance burden. In hot climates, the problems are compounded by a further reduction in battery life and a requirement for energy not only to keep electronic control systems operational but also to keep them cool through air conditioning.

An object of the present invention is to provide a system for generating back-up electrical power while also producing a cool environment for maintaining systems at a cool operating temperature. Such a generating system will operate without the use of fossil fuels and without reliance upon batteries.

According to the present invention there is provided a system for generating back-up electrical power, comprising a vessel adapted to contain a volume of compressed gas; a valve to release gas from the vessel at a predetermined pressure; a scroll expander adapted to receive and pass said released gas and having a rotary member to be rotated by the flow of said released gas passed by the expander; and an electrical generator drivingly connected to the rotatable member of the expander thus to generate a supply of electrical power.

Energy is contained within the gas stored in the vessel at a pressure in the region of 300 bar. The compressed gas energy stored does not degrade with ambient temperature and so has the potential to provide a reliable energy reserve with a long working life. Mechanical energy can thus be recovered when the compressed gas is allowed to expand, and the mechanical energy can be converted to electrical energy using a generator. This system will operate such that when electrical power is required the compressed gas is discharged from the vessel through a regulator to provide an air flow at a reduced pressure in the region of 10 bar. The gas is then supplied to the scroll expander which is mechanically rotated by the passage of the gas therethrough and which then mechanically rotates the electrical generator connected to the shaft of the scroll expander to provide the necessary electrical power.

Embodiment of the invention will be described, by way of example only, with reference to the accompanying drawings, in which:—

Figure 1:
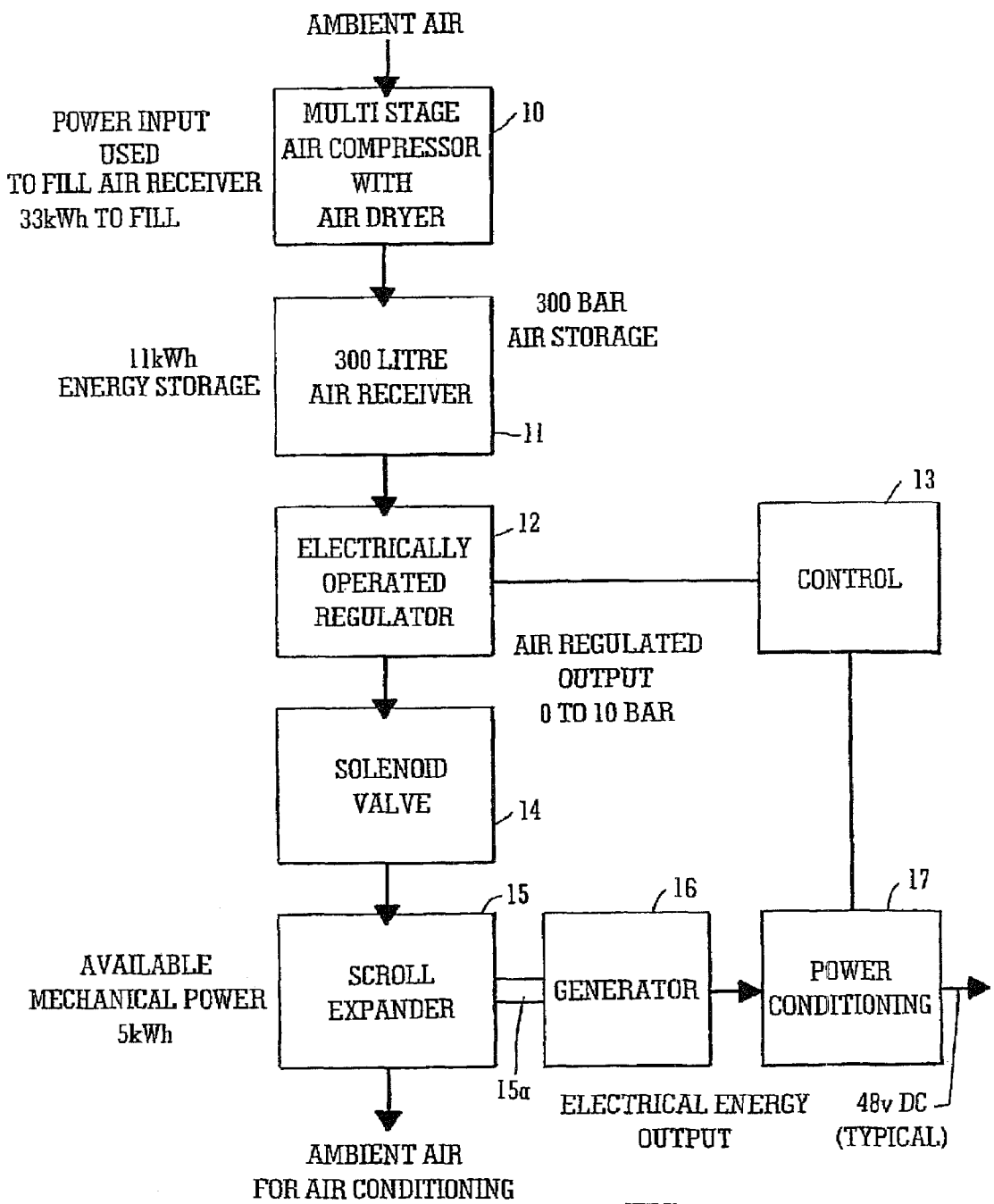
FIG. 1 is a block diagram of the principal components of the system for generating back-up electrical power; in accordance with a first embodiment.

The system of FIG. 1 comprises a multi-stage air compressor and drier 10 adapted to charge a pressure vessel 11 containing, for example, 300 litres of dried and compressed air, the energy equivalent of which is in the region of 11 kW hours. The dry air is stored at a due point of −30° C. Dry air is important to prevent corrosion of the vessel 11 if made of steel, and to prevent icing when the air is expanded. The establishment of such high pressure air in the region of 300 bar enables a considerable density of energy storage for a relatively small volume. The compressor 10 will be driven from the utility electrical supply.

Compressing air to such a high pressure generates considerable low grade heat which may be exhausted from the compressor or utilised in some other application. The vessel 11 may be of steel construction similar to such vessels used to store industrial process gases. Alternatively, the vessel may be of carbon fibre such as those used to contain compressed natural gas in the automotive industry.

Downstream of, and adapted to receive compressed air, from the vessel 11 is a pressure regulator 12 which may be set to reduce the pressure of the stored air to a working level in the region of 10 bar. The regulator is controlled as to its output pressure by an electronically operated control system 13 in order to determine the output power of the system.

At the outlet of the pressure regulator 12 is a solenoid operated valve 14 which is of the type which is normally open and is electrically energised to a closed condition. The valve is held closed electrically while the supply of utility electricity is present and thus opens to supply the air from the regulator when the electrical supply fails. The stored air passing from the regulator 12 is fed via the solenoid valve 14 when opened, to a scroll expander 15. This device is in effect an oil-free scroll compressor reconfigured to operate as an expander. In operation, the compressed air at a pressure of 10 bar is passed through the expander where it expands to atmospheric pressure and where the action of expansion causes a shaft 15a of the scroll expander 15 to rotate.

The expanded air leaving the scroll expander 15 is dry, oil and contaminant-free, and at a temperature below 0° C. This chilled air is ideal in cooling the electronics of the system and air conditioning the room containing the electronics.

A scroll expander is a high efficiency machine when compared to more traditional reciprocating, vane or turbine expanders.

Mechanically connected to the shaft 15a of the expander 15 is an electromagnetic generator 16 producing an electrical supply at, say, 48 volts DC. This may be stepped up or down as demanded by an appliance to which the back-up electrical power is to be supplied.

A power conditioning unit 17 controls the output power and also provides an electrical supply to the control unit 13. The unit 17 includes capacitors to store a small amount of electrical energy. These capacitors will be kept fully charged from the main utility electricity supply such that when the supply fails the capacitors will provide the back-up electrical supply until the scroll expander 15 and the generator 16 can produce the necessary electrical power, which may take one or more seconds to achieve. Therefore the system can offer a true uninterruptible power supply, not just back-up power.

In use, when the normal utility electrical supply is available the scroll expander system is not operational and the stand-by energy is stored in the vessel 11.

An uninterrupted power supply is required instantaneously when the utility supply fails.

Upon failure, and for an initial period while the scroll expander 15 and generator 16 reach operating speed and deliver the required power, the electricity supply is maintained from the capacitor energy store within the power conditioning unit 17.

Furthermore the unit 17 serves a second purpose to match the slow response from the expander 15 and generator 16 to fast changes in demanded load. For example, if it is assumed that the power output demand is changed, near instantaneously, from 300 watts to 600 watts, the system will take a finite time to react to the change in load, and during this period the capacitor energy store will make up the shortfall. Conversely, if the output demand is reduced instantaneously from 600 watts to 300 watts, once again the expander/generator will take a finite time to reach a reduced speed and output, during this period the capacitor energy store will absorb the excess energy delivered by the expander/generator.

It will be appreciated that a system in accordance with the invention provides a truly uninterruptible electrical power supply while storing and releasing oil-free, clean and dry air which thus exits the expander 15 and can be used for air conditioning and cooling of electronic equipment, and does not rely on the use of fossil fuels or batteries. Both the compressor 10 and the expander 15 operate substantially oil-free so that contamination of the air is avoided.

Figure 2:
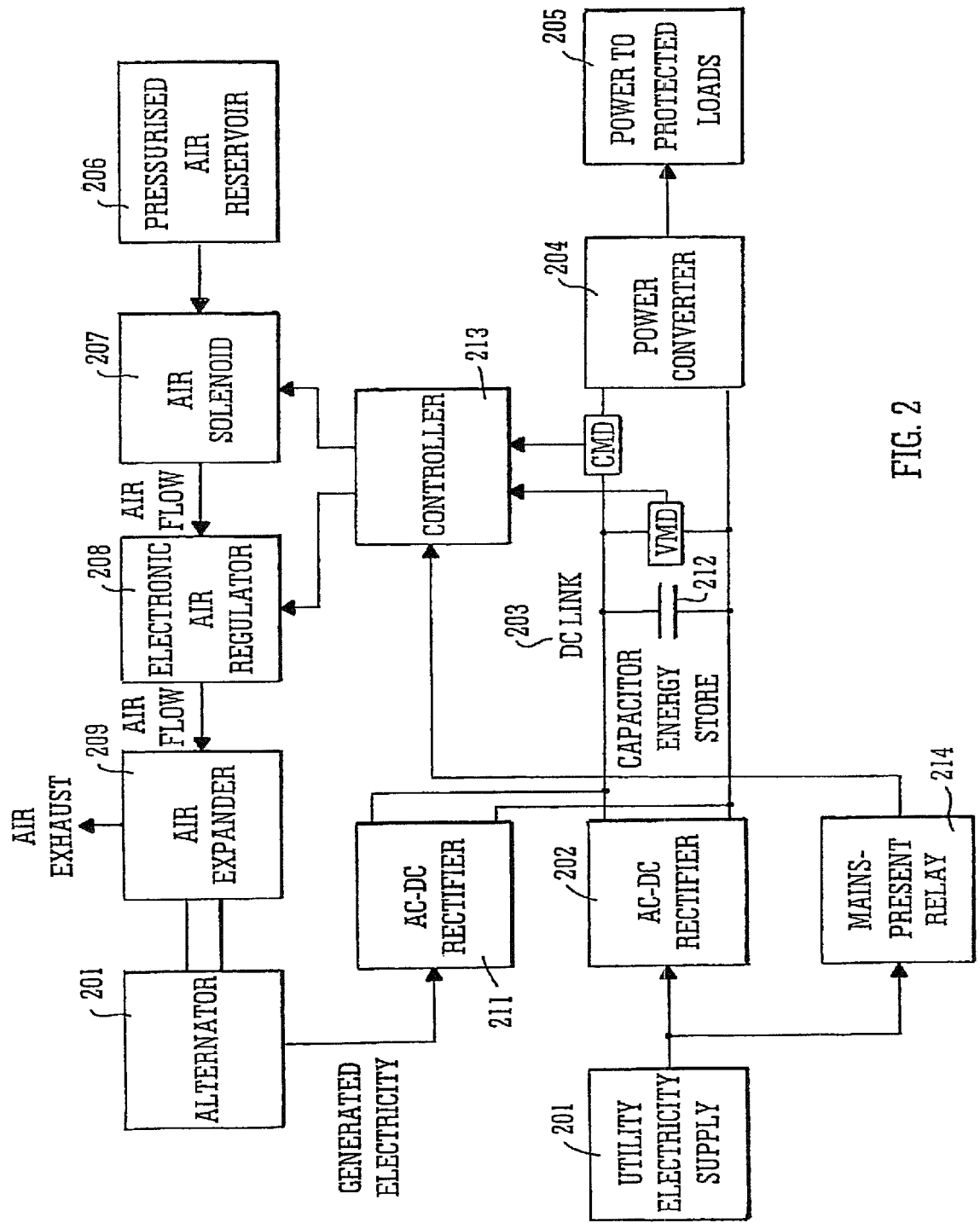
FIG. 2 is a similar diagram of the components of a second embodiment.

Referring now to FIG. 2 there is shown a second embodiment in which the flow of power through the system is further enhanced. The utility electrical supply is illustrated at 201 and consists of an AC power supply which is rectified with a rectifier 202 and then passed through a DC link to be converted in a power converter 204 to a form suitable for the required load.

The DC link comprises a capacitor energy store 212, a voltage measuring device VMD and a current measuring device CMD.

The DC power provided by power converter 204 may be, for example, 48 volts DC for telecommunications applications, but alternatively the power converter 204 could be provided in the form of a mains inverter to provide synthesised AC power for mains frequency and voltage loads.

At times when the utility power supply is interrupted the system will switch to operation from the pressurised air supply 206 equivalent to the air receiver 11 in FIG. 1. Energy is contained within the pressurised air which is allowed to flow through an air solenoid 207 and electronic air regulator 208. The regulator 208 acts as a throttle to regulate air flow to a scroll expander 209 where the air is expanded.

The scroll expander 209 mechanically drives an electrical alternator 210 to generate AC electrical power. This is converted to DC power by a second rectifier 211 whose output is connected to the DC link 203. The power thus flows through the DC link to the output power converter 204 to supply the load 205.

To allow sufficient time for the expander 209 to reach its critical operating speed, and to react to rapid changes in load demand, the capacitor energy store 212 is provided at the DC link.

Figure 3:
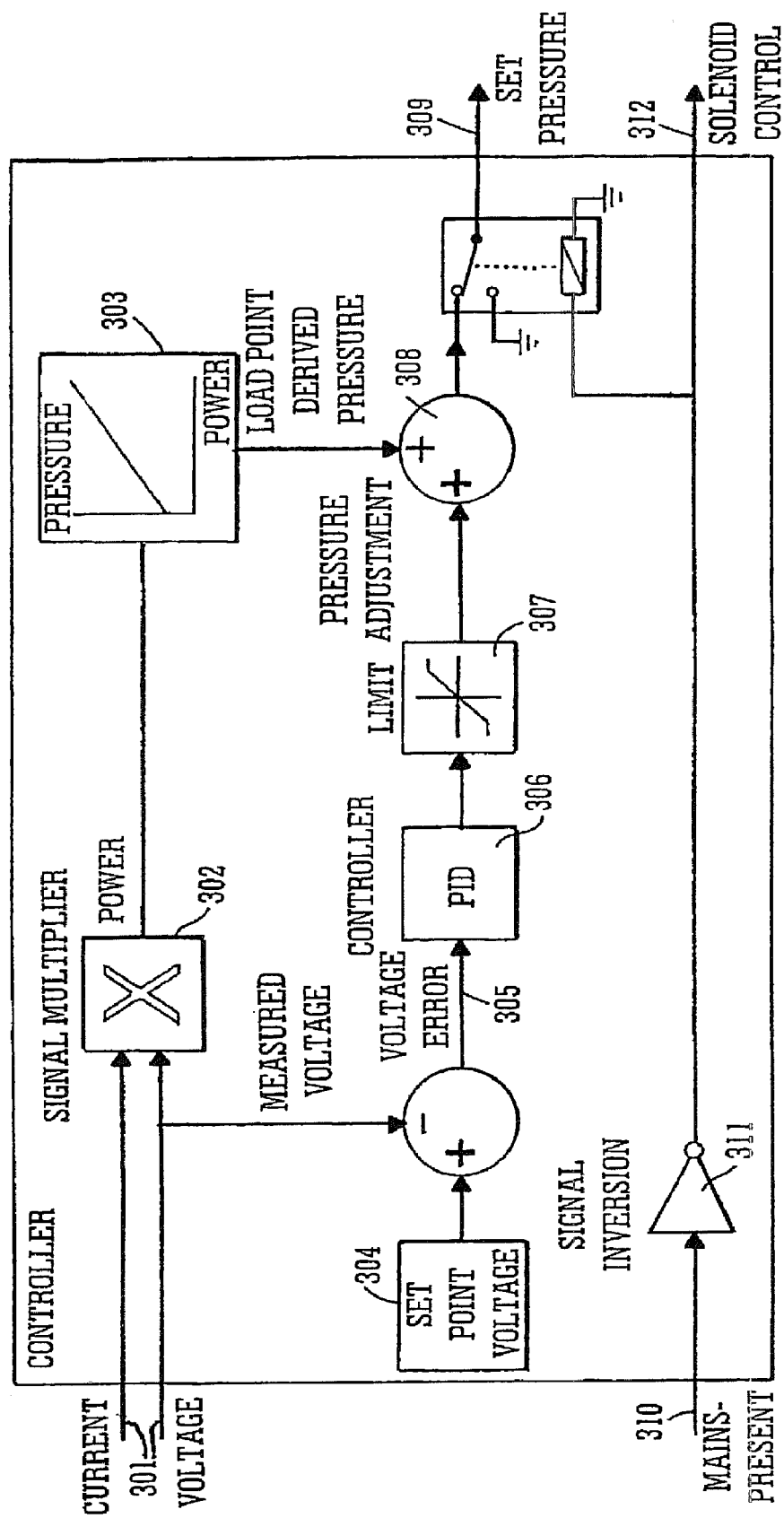
FIG. 3 illustrates a control algorithm.

Management of power flow during air operation, i.e. when the utility supply is interrupted, is undertaken by an electronic controller 213. The control algorithms are illustrated in FIG. 3 where DC link voltage and current is continuously monitored at 301, and the demanded power is calculated by signal multiplication at 302. The controller contains a mathematical model 303 for the operation of the expander which can thus output the required air pressure for any load demand.

Simultaneously, the actual DC link voltage is compared with a set point DC link voltage at 304, and any error signal is produced at 305. This signal is passed through a proportional-integral-derivative (PID) controller 306 and a limiter 307 to provide a pressure adjustment signal.

Finally, the load demand derived pressure signal from model 303 is summed at 308 with the pressure adjustment signal before passing from the controller 213 as a set pressure signal 309 to set the electronic air pressure regulator 208 and air solenoid 207.

At all times, the controller 213 is monitoring the utility electricity supply at 201 via a mains-present relay 214. The mains-present signal at 310 passes through a signal inverter 311 and is used to control the air solenoid 207 and to gate the set pressure signal at 309. Thus, when the mains electricity supply is available the air solenoid 207 is "off" and the set pressure signal is blocked.

Currently available air expanders tend to under-expand the compressed air thus ejecting exhaust air which still contains significant energy at pressures above atmospheric pressure. The following is a description of a system for recovering the energy contained within this under-expanded air and therefore optimising the efficiency of the system.

Figure 4:
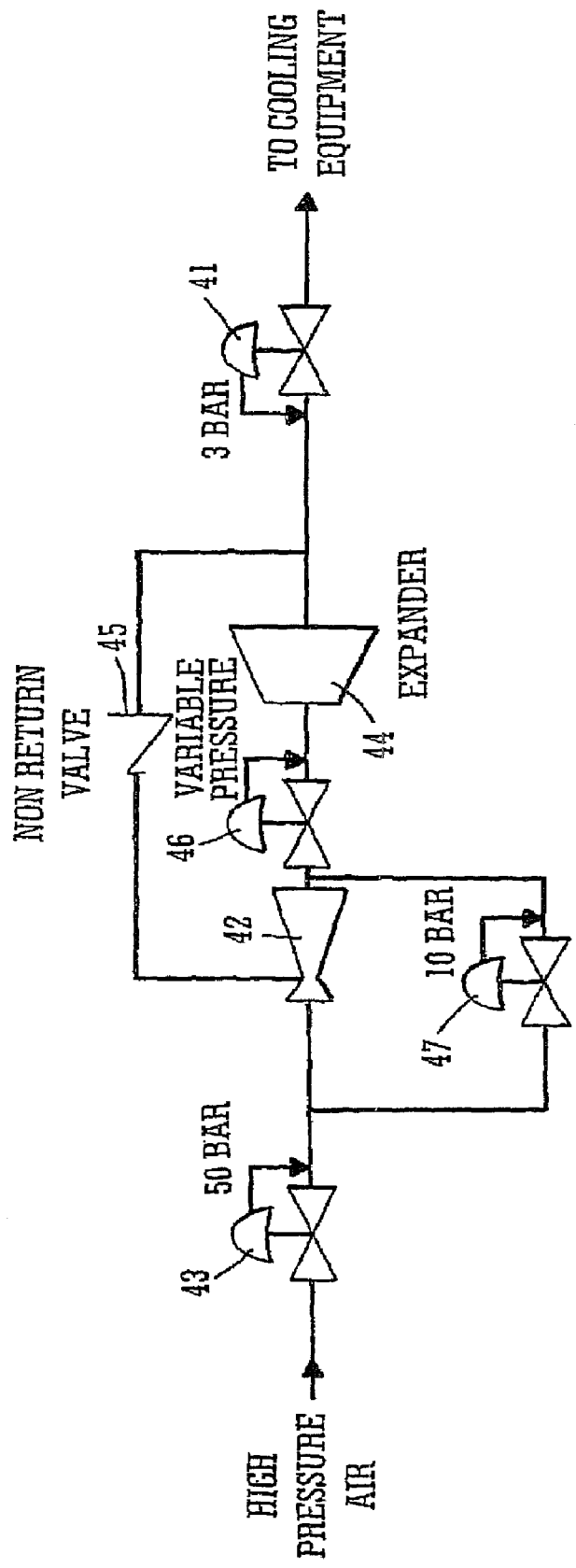
FIG. 4 illustrates the components of a system for recovery of energy from the systems of FIGS. 1 and 2.

Air expanders have a compression ratio lower than the ratio of driving air pressure to atmospheric air pressure. As an example, the air expander 15, 209, may have a 3:1 expansion ratio. Such an expander may be required to be supplied with air at a pressure of 9 bar to deliver a required power output. In this case, the air will leave the expander at 3 bar still containing significant energy. FIG. 4 illustrates a system for recovering the energy from the pressurised exhaust air.

In the case of an expander with a low expansion ratio as discussed above, minimal power output is lost if the pressure at the outlet from the expander is held at a pressure above atmospheric pressure by use of a back pressure regulating valve. Such a valve is shown at 41 in FIG. 4. Since air is normally available at a much higher pressure than is required by the expander, the high pressure air can be used to increase the pressure of some of the air from the expander so as to reduce the quantity of air required to produce a given amount of power.

The high pressure air must first be reduced to a constant pressure suitable to drive the expander venturi 42, by a regulator 43. The air then passes into the venturi as the driving air and this entrains the lower pressure air from the outlet of the expander which may be at atmospheric pressure or at a higher pressure if the pressure relief valve 41 is included. Thus the low pressure outlet air passes through non-return valve 45 into the venturi 42. The combined air is exhausted at a pressure level between those of the driving air and the entrained air.

If the power requirement of the load is variable, a further pressure regulator 46 may be included to vary the pressure into the expander in response to a control signal. This regulator is equivalent to that shown at 208 in FIG. 2 and is operated from the electronic control system 213.

A further valve 47 may be introduced either as a regulator to ensure sufficient air supply at times of high demand or as a solenoid valve which opens when the pressure from the high pressure air source falls below a level sufficient to drive the venturi 42.

Typical operating pressures are shown in FIG. 4 against each valve/regulator. At such pressures about 25% of the flow through the expander 44 will be removed via the venturi and passed through the expander again.

A system for generating back-up electrical power as described herein, and in accordance with the invention, may be utilised with remote filling capability. That is, highly compressed air may be provided in reservoirs which are installed, pre-loaded at a remote location such as a remote telecommunications terminal which conventionally contains batteries for providing back-up power. Thus, in a remote terminal cabinet a power generating system as described herein may be housed to become operational when required i.e. when the utility power supply fails. The compressed air-driven back-up power system therefore comes into play when required, and the system occupies considerably less space than a bank of back-up batteries. The tanks or reservoirs containing the compressed air may be large and sited either below or above ground or within a separate enclosure where they may be readily exchanged when required and thus do not need to occupy space within the normal remote terminal cabinet.

It is not intended to limit the invention to the above examples only. For example, the vessel 11 may contain a gas other than air such as might be evolved from an industrial process. Furthermore, several such vessels may be connected in tandem thus to increase the workable life of the system in the event of utility electrical supply failures occurring frequently during a short period.

The invention claimed is:

1. A power supply system comprising:
    a) a utility electricity supply connectible to a load; and
    b) a back-up electricity supply also connectible to the load, the back-up electricity supply comprising:
        i. a vessel containing a volume of compressed gas;
        ii. a valve to release gas from the vessel at a predetermined pressure when the utility electricity supply fails;
        iii. a scroll expander connected to said valve to receive said gas when released from said vessel and having a rotary member rotated by the passage of said gas through the expander;
        iv. an electricity generator driven by said rotary member to provide said back-up power to the load;
        v. a dc power conditioning unit supplied by said generator; and
        vi. a power converter connected between the conditioning unit and the load, wherein the power conditioning unit includes at least one capacitor energy store that provides sufficient back-up energy to exclusively power the power converter and load both when the supply to the load is interrupted and when the power demand of the load changes until the back-up power provided by said generator matches the load requirement; and a regulator throttles the flow of the gas introduced into the scroll expander to a pressure which is determined according to the level of electrical back-up power demanded by the load.

2. A system according to claim 1, including a multi-stage air compressor and dryer connected to the vessel for supply thereto of compressed and dried gas.

3. A system according to claim 1, wherein the vessel retains gas at a pressure at or in the region of 300 bar and at or in the region of dew point of −30° C.

4. A system according to claim 2, wherein the multi-stage air compressor is adapted to be driven from the utility electrical supply.

5. A system according to claim 1, wherein the pressure regulator and the gas release valve are connected to an electrically operated control system.

6. A system according to claim 1, wherein the gas release valve is of the type which is normally open and is electrically energized to a closed condition, the valve, in use, being maintained closed electrically while the utility electrical supply is present and thus opening to supply gas from the regulator when the utility electrical supply fails.

7. A system according to claim 1, wherein the scroll expander is an oil free scroll compressor reconfigured to operate as an expander.

8. A system according to claim 1, wherein the scroll expander releases gas such that it may expand to atmospheric pressure at a temperature below that of ambient air.

9. A system according to claim 1, wherein the at least one capacitor of the power conditioning unit is adapted to release or absorb electrical power in the event of a change in power demand from the load.

10. A system according to claim 9, wherein the power conditioning unit includes a DC link which comprises said at least one capacitor energy store, a voltage measuring device and a current measuring device.

11. A system according to claim 1, including means to recycle a portion of gas released from the output of the expander to be entrained with gas supplied to the expander from the vessel.

12. A system according to claim 1, including a plurality of vessels each adapted to contain a volume of compressed gas, the vessels being connected together in tandem.

13. A system according to claim 1, wherein the regulator is controlled by an electrically operated control system using inputs of measured voltage and current.

14. A system according to claim 13, wherein the control system multiplies said inputs of measured voltage and current to determine a power requirement of the load and thereby an input value to provide a required pressure of the gas entering the scroll expander.

15. A system according to claim 14, wherein said input value is summed with a voltage error signal determined by comparing said measured voltage with a set point voltage and applying the difference to a proportional-integral-derivative (PID) controller and a limiter, the sum forming an input value for an electronic air pressure regulator that determines said required pressure.

16. A system according to claim 1, wherein said scroll expander and generator are not operational during utility electricity supply.

17. A back-up electricity supply for connection to a load adapted to be supplied also by an alternate electricity supply, the back-up electricity supply comprising:
    i. a vessel containing a volume of compressed gas;
    ii. a valve to release gas from the vessel at a predetermined pressure;
    iii. a scroll expander connected to said valve to receive said gas when released from said vessel and having a rotary member rotated by the passage of said gas through the expander;
    iv. an electricity generator driven by said rotary member to provide said back-up power to the load;
    v. a dc power conditioning unit supplied by said generator; and
    vi. a power converter connected between the conditioning unit and the load, wherein the power conditioning unit includes at least one capacitor energy store that provides sufficient back-up energy to exclusively power the power converter and load when the supply to the load is interrupted and when the power demand of the load changes and until the back-up power provided by said generator matches the load requirement; and
    vii. a regulator to throttle the flow of the gas introduced into the scroll expander to a pressure which is determined according to the level of electrical backup power demanded by the load.

* * * * *